United States Patent [19]

Tracy

[11] 4,413,765
[45] Nov. 8, 1983

[54] METHOD AND APPARATUS FOR IN SITU REPAIR OF A WORN PIPE SECTION

[76] Inventor: Fred L. Tracy, P.O. Box 111, 40th Ave. & County 4, Roll, Ariz. 85347

[21] Appl. No.: 237,526

[22] Filed: Feb. 23, 1981

[51] Int. Cl.³ ............................................. B23K 37/04
[52] U.S. Cl. ................................... 228/119; 138/97; 285/3; 285/16
[58] Field of Search ............... 228/119; 29/157, 402.1, 29/402.3, 237, 272, 281.1, 281.6, 282; 138/97; 285/16, 3, 4

[56] References Cited

U.S. PATENT DOCUMENTS

| | | | |
|---|---|---|---|
| 1,211,500 | 1/1917 | Strong | 138/97 |
| 1,339,209 | 5/1920 | Livensparger | 138/97 |
| 3,284,883 | 11/1966 | Haverfield et al. | 29/281.6 X |
| 3,422,519 | 1/1969 | Fehlman | 29/281.6 |
| 3,658,231 | 4/1972 | Gilman | 228/44.5 |
| 3,920,171 | 11/1975 | Clavin | 228/44.5 |
| 4,065,846 | 1/1978 | Leonard, Jr. | 228/119 |

Primary Examiner—Kenneth J. Ramsey
Attorney, Agent, or Firm—Berman, Aisenberg & Platt

[57] ABSTRACT

A method and apparatus for in-place repair of a section of pipe unduly worn along a portion of its circumference by friction of material fed therethrough. The method includes the steps of marking the ends of the worn pipe section by circumferential lines, clamping the worn pipe section to hold it coaxially aligned and longitudinally in place with respect to the remainder of the pipe and, while thus clamped, cutting the worn pipe section free of the pipe, rotating the freed pipe section sufficiently to displace the worn surface portion from substantial further contact with material to be fed through the pipe, and welding the rotated section to the remainder of the pipe. The apparatus includes two pairs of inner and outer clamps, one pair clamping the worn pipe section at one of its ends and the second pair at its other end. Each inner clamp includes arcuate sleeve portions tightly fastened about one end of the worn pipe section near the marked line delineating the end and a radially outwardly disposed bearing flange. Each outer clamp includes first arcuate sleeve portions fastened to the pipe near one of its junctures with the worn pipe section, second arcuate sleeve portions longitudinally displaced from the first sleeve portions and fastened together to form a bearing surface for coaxial rotation of the worn pipe section, spaced bars disposed outwardly of the pipe to connect the first and second sleeve portions and an inwardly directed bearing plate affixed to the bars for engagement with the bearing flange of the inner clamp to prevent downward longitudinal movement of the worn pipe section while it is being rotated.

20 Claims, 7 Drawing Figures

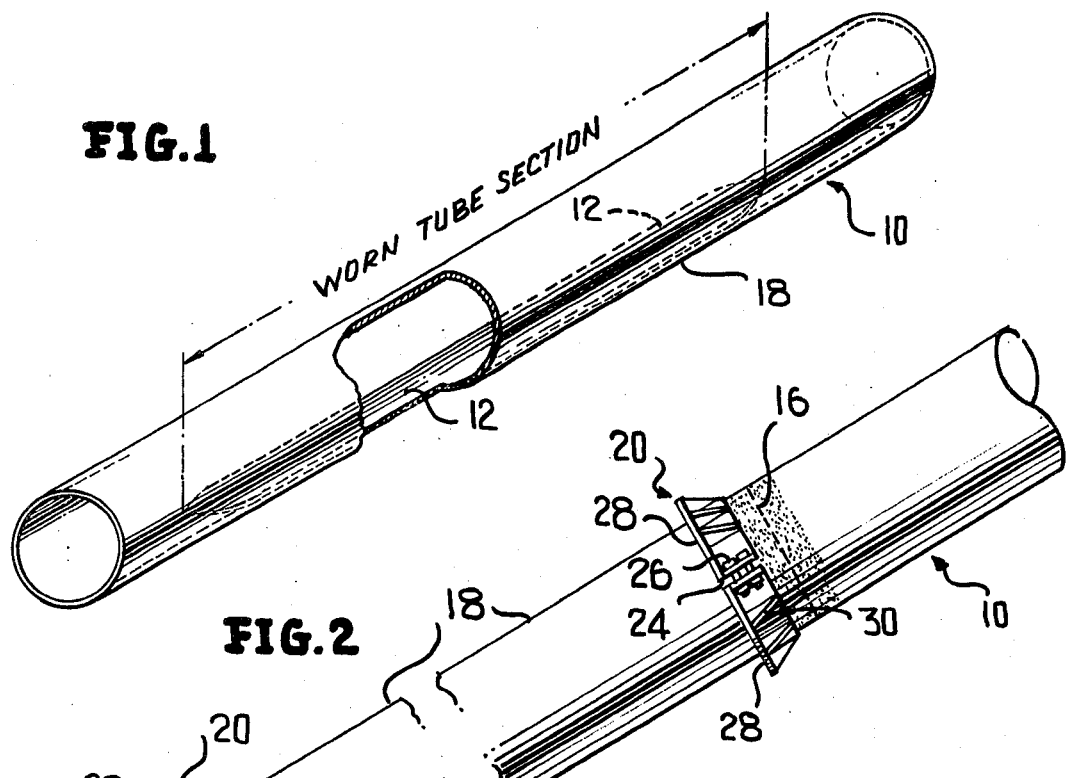

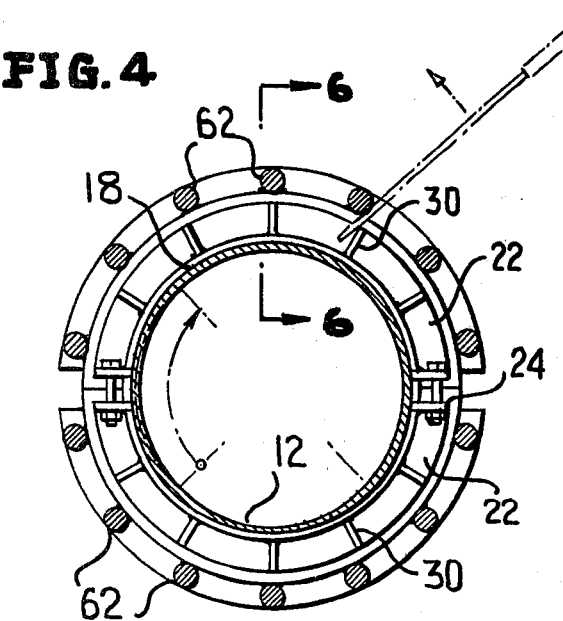
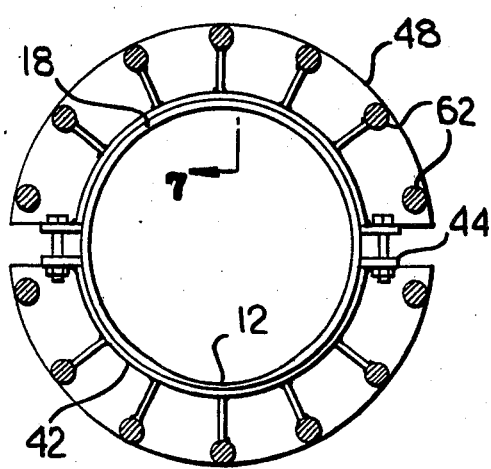
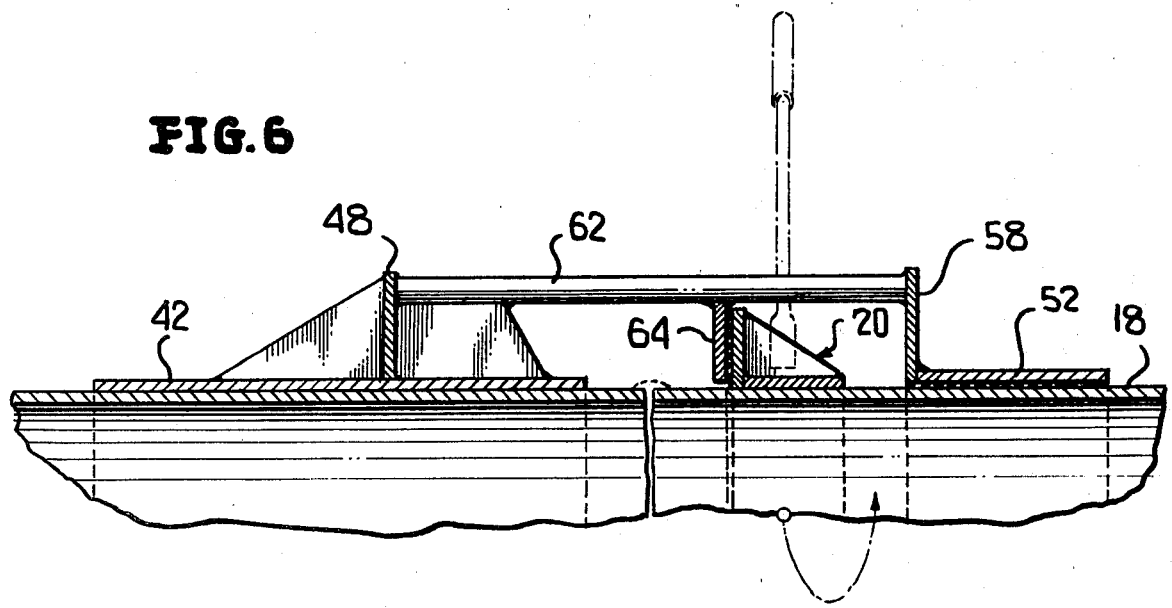
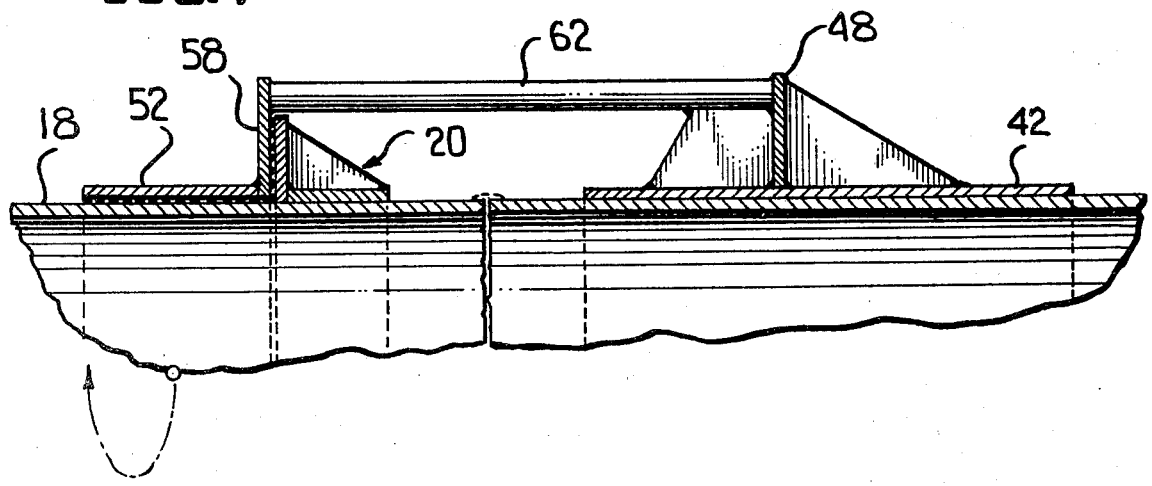

1

METHOD AND APPARATUS FOR IN SITU REPAIR OF A WORN PIPE SECTION

BACKGROUND OF THE INVENTION

1. Field

This invention relates to a method and apparatus for in-place repair of a worn pipe section, which clamps the worn section coaxially and longitudinally in place and, while retaining this clamped position, permits the operator to cut free the section, rotate the section to displace the worn part, and subsequently reweld the rotated section to the remainder of the pipe.

2. The Prior Art

Methods and apparatus for positioning and clamping pipe sections in abutting relation for the purpose of welding the ends of the pipe sections together are known. A typical example is revealed in U.S. Pat. No. 3,920,171 issued to Edward A. Clavin as comprising a pipe alignment clamp inserted in one pipe and having gripping shoes at its forward end that may be set in a second pipe, together with means to cause the pipe ends to advance and align so as to form a properly spaced gap for welding the pipe ends together. This apparatus, being operative from inside of the pipe, is impossible to use outside of the pipe as in the present invention to repair an already connected but unduly worn pipe section.

Another example of the prior art is shown in U.S. Pat. No. 3,658,231 issued to Bruce Calvin Gilman. This patent discloses a complex structure useable at the sea bottom to weld pipeline strings together. Such patent contains a welding chamber into which the pipe ends are inserted, aligned and advanced by hydraulic or pneumatic means to form a welding gap, while further means are provided to purge sea water from the welding chamber. The disclosed apparatus is far too complex and cumbersome to be useful for applicant's purpose and would necessitate moving the cut pipe section out of place to assemble in the patented structure. Furthermore, the patented apparatus can be used for welding only one pipe joint at a time, while applicant requires clamps that retain two pipe joints or connections in place.

U.S. Pat. No. 3,422,519, issued Jan. 21, 1969, to Barry F. Fehlman, discloses a welding clamp used to align abutting portions of pipe ends for welding and which has some similarity to applicant's clamp structure in that it provides longitudinally displaced sleeves which are fastened on opposite sides of a pipe joint and are carried by a cage of longitudinal bar members to permit welding of the joint. The patented structure does not permit one pipe to rotate with respect to the other once the clamp is fastened as is necessary in applicant's clamp, nor does the patentee disclose the concept of repairing a worn pipe section by holding it in place with clamp structure which permits the section to be rotated and then rewelded.

SUMMARY OF THE INVENTION

The present invention is primarily intended to provide a method and apparatus for repairing a worn pipe or tube section in-place, which is not possible with known methods or structure.

Another important object of the invention is to provide a simple and inexpensive method and apparatus for repairing a worn pipe section in-place.

A further important object of the invention is to provide a method and apparatus for repairing a worn pipe section in situ by rotating the pipe section to displace the worn part from further frictional contact with material to be fed through the pipe and, thus, greatly prolonging the life of the pipe and saving the expense of early replacement.

Still another object of the invention is to provide clamping apparatus which can be fastened to the pipe in such manner than the worn pipe section can be cut in-place and held coaxially and aligned longitudinally to prevent displacement with respect to the remainder of the pipe while the worn section is rotatingly displaced and subsequently rewelded to the pipe.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments, when read in connection with the accompanying drawings, wherein like reference characters indicate like parts throughout the several Figures, and in which:

FIG. 1 is a diagrammatic illustration of a portion of a feed pipe or tube having a worn bottom part;

FIG. 2 is a similar view of the pipe of FIG. 1 with the worn section marked for cutting and with inner clamps attached thereto according to the invention;

FIG. 3 is an elevational and slightly enlarged view of the feed pipe of FIG. 2, with outer clamps according to the invention also fastened to the pipe and surrounding the inner clamps;

FIG. 4 is a transverse sectional view through the assembly of inner and outer clamps taken along line 4—4 of FIG. 3 and looking in the direction of the arrows;

FIG. 5 is a sectional view similar to FIG. 4 but showing the other assembly of inner and outer clamps, with the view taken along line 5—5 of FIG. 3 and looking in the direction of the arrows;

FIG. 6 is an enlarged, longitudinal sectional view taken along line 6—6 of FIG. 4 and looking in the direction of the arrows; and FIG. 7 is a sectional view similar to FIG. 6 but taken along lines 7—7 of FIG. 5 and looking in the direction of the arrows.

DESCRIPTION OF THE PREFERRED EMBODIMENTS

Referring more particularly to the drawings, FIGS. 1-3 illustrate certain of the steps involved in performing the method of the present invention. FIG. 1 shows a portion of a grain feed pipe, generally referenced 10, which is installed, for example, at a substantial height above the ground to feed grain by gravity to a storage bin, not shown. The illustrated part of the grain pipe 10 is inclined downwardly and, as a result, the weight of grain passing through the pipe to fill the bin, after a period of time will cause greater wear of the bottom part of the inner circumference of the pipe 10 because of greater friction exerted against the bottom surface of pipe or tube 10. The portion of the tube or pipe thus unduly worn is indicated at 12.

Considerable expense would be involved in replacing the entire feed pipe 10 merely because longitudinal parts along the bottom area become worn. Not only is the cost of the pipe prohibitive, but the expense of machinery such as cranes, or the like, to lift and install new pipe is very great. The method of the present invention avoids this expense by enabling repair of the pipe in situ and in such manner as to even the wear on the feed pipe and, thus, greatly extend its useful life.

The method of the invention broadly contemplates the steps of marking a worn section of the pipe to be turned in-place, holding the worn section coaxially and longitudinally in place with respect to the remainder of the pipe while then cutting the worn section free, rotating the free section an adequate amount, say 90°, and reconnecting the worn section, as by welding, to the pipe. In the described method, FIG. 2 illustrates circumferential lines 14 and 16 which have been marked on pipe 10 to delineate the bottom and top ends, respectively, of the pipe section 18 which includes the worn bottom 12 and which section it is desired to turn in-place. A pair of identical inner clamps 20, to be more fully described later, are installed respectively just above lower line 14 and just below upper line 16, as in FIG. 2. The inner clamps 20,20 are fastened to the worn pipe section 18 to rotate therewith and form part of clamping apparatus, which further includes outer clamps 40 and 60 at the bottom and top, respectively, of the worn section 18. This clamping apparatus performs the holding step of the method mentioned above. Thus, when outer clamps 40 and 60 are fastened to the pipe 10 below line 14 and above line 16, respectively, portions of the clamps, as will be later described, will hold the worn section coaxially and longitudinally in place while the steps are then performed of cutting the worn section free along lines 14 and 16, rotating the section 18 approximately 90°, and reconnecting the section by welding along lines 14 and 16. The clamping structure 20, 40, 60 is then unfastened and removed for use elsewhere on the same or other pipe, and may be reinstalled subsequently at the same place to again rotate the same pipe section when its new bottom area becomes worn. It is apparent that three 90° rotations of worn section 12 may be made at different times to result in even wear over the entire inner surface of section 18, and to extend the life of the pipe 300%.

The preferred embodiment of the clamping apparatus 20, 40 and 60 will now be described with further reference to the described FIGS. 1-3 and additional FIGS. 4-7.

Each of the inner clamps 20 includes a plurality of arcurate sleeve portions such as the semicircular collars 22. At the ends, each collar 22 has an outwardly directed, diametrical locking lug 24 with a plurality of holes, not referenced, which receive locking bolts 26. The bolts 26, passing through aligned holes in lug 24, serve to draw the sleeves 22 into tight engagement with the worn pipe section 18 so as to turn therewith when it is rotated. Each sleeve 22 has a radial outwardly directed bearing flange 28 whose function is to engage a similar bearing plate, to be described, in the surrounding outer clamp 40 or 60 and thus prevent longitudinal movement of pipe section 18 when it is freed from pipe 10. The bearing flange 28 is supported and strengthened by a plurality of gussetts 30 of triangular shape.

The outer clamps 40 and 60 are preferably identical in structure except as to the location of the bearing plate in each, but also differ in that, when installed, they are oppositely directed, so that one surrounds the bottom juncture line 14 and the other surrounds the top juncture line 16 of worn pipe section 18, as shown in FIG. 3. The outer clamps each comprise arcuate sleeve portions, preferably a pair of semicircular collars 42,42 with diametrical outwardly directed locking flanges 44,44, and are drawn into tight engagement with the pipe 10 by fastener bolts 46 passing through aligned openings in the locking flanges. Near the center of each collar portion 42, an outwardly directed annular flange 48 is welded to the collar and strengthened by a plurality of triangular gussett plates 50. A second pair of semicircular collar portions 52,52 with locking flanges 54 are held together by fastener bolts 56 to define a cylindrical bearing whose inside diameter is slightly larger, say by 0.03 inches, than the outer diameter of worn pipe section 18 and, thus, rotatingly supports the worn section. The collar portions 52,52 are displaced longitudinally of collar portions 42,42 and are retained in fixed relation longitudinally and coaxially by a pair of outwardly directed annular radial flanges 58,58, welded or otherwise integrated with the bearing collars 52, and a support means which comprises a cage of spaced longitudinal bars 62 welded or otherwise secured to the perimeters of flanges 48 and 58. The cage of bars 62 surrounds the respective juncture line 14 and 16 and the associated one of the inner clamps 20,20. As seen in FIG. 3, the lower clamp 40 is provided with a pair of aligned annular bearing plates 64,64 disposed radially of and fixed to the bars 62 of the cage mentioned and disposed between flanges 48 and 58 so as to engage the underside of the bearing flanges 28,28 of the associated inner clamp 20 to prevent longitudinal downward movement of the worn pipe section 18, when it is freed or turned. In the upper or right hand position shown in FIG. 3, the previously described radial annual plates 58,58, which connect sleeves 52 and 42 through the bars 62 of the upper, outer clamp 60, perform the same bearing function as plates 64,64 on lower clamp 40, inasmuch as the installation of the inner clamp 20 below upper juncture line 16 is made to place the bearing flanges 28 immediately adjacent flanges 58,58 on clamp 60.

It should now be clear from the above description how the described clamp structure operates to hold the pipe section 18 from coaxial and longitudinal displacement during the method steps of cutting the worn section free, rotating the same, and reconnecting the worn section by welding. The outer clamp collars 42,42 are fastened tightly to the pipe 10 while the longitudinally inwardly disposed collars 52,52 form cylindrical bearings for rotation of worn section 18 about the common pipe axis. The inner surfaces of collars 52,52 may be greased to facilitate frictionless rotation of pipe section 18. The inner clamps 20 are fastened to section 18 and rotate therewith. Consequently, the engagement by bearing flanges 28 of the inner clamps with bearing plates 64 and 58 of the outer clamps prevents lateral downward shifting of pipe section 18 when it is freed or rotated. Grease may also be applied between these bearing surfaces 28,64 and 28,58 to reduce friction. The spacing between bars 62, and their distance from the outside surface of pipe 10, permits entry of a cutting torch tip to separate the worn section along juncture lines 14 and 16 and, later, a welding torch tip to reconnect the section 18 with pipe 10. This spacing also permits the introduction of a bar or other tool, FIG. 4, to engage the gussetts 30 on inner clamps 20 and thereby rotate the clamps and the section 18 when it is desired to turn the section 18 a sufficient amount to move the worn bottom about 90°.

It will be seen that clamps 20 form anti-displacement means in conjunction with plate 64 in the lower clamp 40 and in conjunction with plate 58 in the upper clamp 60.

It should be apparent from the above that the described clamping apparatus may be varied in size, shape and design to fit various sized and configured tubes or pipes while still practicing the concept and method of repair constituting the present invention.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. The method of repairing in situ a pipe section which has been unduly worn along a portion of its inner circumference by friction of material fed therethrough, comprising the steps of:
(1) marking the ends of said worn pipe section,
(2) clamping the worn pipe section coaxially aligned and longitudinally in place with respect to the remainder of the pipe, and while retaining the pipe section clamped as per step (2) performing the further steps of
(3) cutting said pipe at the marked ends to free the worn pipe section from the remainder of the pipe,
(4) rotating the freed pipe section a sufficient degree to displace the worn surface portion from substantial further contact with material to be fed through the pipe, and
(5) reconnecting the rotated pipe section to the remainder of the pipe.

2. The method of repairing a pipe section in situ according to claim 1, wherein said clamping of step 2 is performed by clamp means which permits rotation of the pipe section about its axis.

3. The method of repairing a pipe section in situ according to claim 1, wherein said rotation of the pipe section stated in step (4) is a rotation of about 90°.

4. The method of repairing a pipe section in situ according to claim 1, wherein said reconnecting of the rotated pipe section of step (5) is by welding.

5. Clamp apparatus for in situ repair of a section of a pipe unduly worn along its inner surface by friction of material passing therethrough, comprising inner and outer clamps adapted to be respectively fastened to one end of the pipe section to be repaired and the remainder of the pipe adjacent a line delineating their juncture, said inner clamp having arcuate sleeve portions for straddling the pipe section, means for fastening said sleeve portions together tightly about the pipe section, and an outwardly directed bearing flange connected to at least one sleeve portion, and said outer clamp comprising first arcuate sleeve portions including means for fastening said first portions in tight engagement with the pipe, second arcuate sleeve portions longitudinally displaced from the first sleeve portions and including means for fastening the second sleeve portions to form a bearing for rotation of said pipe section after it has been freed from the pipe by cutting along said juncture line, spaced bars disposed outwardly of the pipe and connecting said first and second sleeve portions, and at least one inwardly directed bearing plate affixed to said bars for rotational engagement with said bearing flange of the inner clamp when the pipe section is rotated.

6. Clamp apparatus for in situ repair of a section of pipe according to claim 5, wherein said bearing flange and bearing plate are each radially directed.

7. Clamp apparatus for in situ repair of a section of pipe according to claim 6, wherein said bars are connected to the first and second sleeve portions by radial flanges.

8. Clamp apparatus for in situ repair of a section of pipe according to claim 7, wherein said bearing plate is connected to said bars intermediate said radial flanges connecting the bars to the first and second sleeve portions.

9. Clamp apparatus for in situ repair of a section of pipe according to claim 5, wherein two pairs of said inner and outer clamps are provided, one pair for fastening to the pipe section and pipe at a first selected location on the pipe section and the other pair for fastening at a second selected location on the pipe section spaced from said first location.

10. Clamp apparatus for in situ repair of a section of pipe according to claim 8, wherein two pairs of said inner and outer clamps are provided, one pair for fastening to the pipe section and pipe at a first selected location on the pipe section and the other pair for fastening at a second selected location on the pipe section spaced from said first location.

11. Clamp apparatus for in situ repair of a section of pipe according to claim 10, wherein said bars of the outer clamps are spaced apart and away from the pipe sufficient to permit entry between the bars of cutting and welding torch tips to permit cutting of the pipe at the marked ends to free the pipe section for rotation and subsequent to rotation for reconnecting the pipe section by welding.

12. Clamp apparatus for in situ repair of a section of pipe according to claim 11, where said pipe section is disposed at an angle with respect to the horizontal and has upper and lower end portions, said bearing plate of the outer clamp of the pair of clamps to be fastened adjacent to the upper end portion being disposed closer to the second sleeve portions than the corresponding bearing plate of the pair of clamps to be fastened adjacent to the lower end portion so that in cooperating with the bearing flange of the upper inner clamp downward longitudinal displacement of the pipe section during rotation is prevented.

13. Clamp apparatus for in situ repair of a section of pipe unduly worn in its side wall by freeing said worn section, rotating it axially, and re-connecting said worn section to the non-worn section, said apparatus comprising first and second elongated clamp means adapted to be mounted at spaced apart locations on the exterior of said pipe adjacent to the opposite ends of said worn section, each of said clamp means comprising attachment means for mounting said clamp means on said pipe, and bearing means spaced from said attachment means for supporting said worn pipe section aligned with said non-worn section and permitting rotation of said worn section with respect to said non-worn section after it is freed from the non-worn section of said pipe, wherein said bearing means comprises an element which encircles said worn section and provides a bearing surface to allow said worn section freedom to rotate with respect to said bearing means when said element is closed to its fullest extent around said worn section.

14. Clamp apparatus for in situ repair of a pipe unduly worn in its side wall by freeing said worn section, rotating it axially, and re-connecting said worn section to the non-worn section, said apparatus comprising first and second elongated clamp means adapted to be mounted at spaced apart locations on the exterior of said pipe adjacent to the opposite ends of said worn section, each of said clamping means comprising attachment means for mounting said clamp means on said pipe, and bearing means spaced from said attachment means for supporting said worn pipe section aligned with said non-worn section and permitting rotation of said worn pipe section with respect to said non-worn section after it is freed from the non-worn section of the pipe, and anti-displacement means for preventing longitudinal movement of the freed worn section.

15. Clamp apparatus for in situ repair of a section of pipe unduly worn in its side wall by freeing said worn section, rotating it axially, and re-connecting said worn section to the non-worn section, said apparatus comprising first and second elongated clamp means adapted to be mounted at spaced apart locations on the exterior of said pipe adjacent to the opposite ends of said worn section, each of said clamp means comprising attachment means for mounting said clamp means on said pipe, bearing means spaced from said attachment means for supporting said worn pipe section aligned with said non-worn section and permitting rotation of said worn section with respect to said non-worn section after it is freed from the non-worn section of said pipe, support means extending between and connecting said attachment means and said bearing means and adapted to at least partially surround and be spaced from the wall of said pipe, and anti-displacement means for preventing longitudinal movement of the freed worn section, said anti-displacement means comprising first bearing means adapted to be carried by said worn section and second bearing means carried by said support means, said first and second bearing means adapted to be in sliding contact with each other.

16. Clamp apparatus for in situ repair of a section of pipe unduly worn in its side wall by freeing said worn section, rotating it axially, and re-connecting said worn section to the non-worn section, said apparatus comprising first and second elongated clamp means adapted to be mounted at spaced apart locations on the exterior of said pipe adjacent to the opposite ends of said worn section, each of said clamp means comprising attachment means for mounting said clamp means on said pipe, bearing means spaced from said attachment means for supporting said worn pipe section aligned with said non-worn section and permitting rotation of said worn section with respect to said non-worn section after it is freed from the non-worn section of said pipe, support means extending between and connecting said attachment means and said bearing means and adapted to at least partially surround and be spaced from the wall of said pipe, and anti-displacement means for preventing longitudinal movement of the freed worn section, said anti-displacement means comprising a first plate adapted to be carried by said worn section and a second plate carried by said support means, said first and second plates adapted to be in face-to-face contact whereby longitudinal displacement of the worn section is prevented while said section and said first plate are rotated together with respect to said second plate.

17. The clamping apparatus of claim 15, wherein said first bearing means comprises a pair of U-shaped members.

18. The clamping apparatus according to claim 13, wherein said attachment means comprises a pair of clamping elements.

19. The clamping apparatus according to claim 13, wherein said bearing means comprises a pair of U-shaped members.

20. The clamping apparatus according to claim 13, and support means extending between and connecting said attachment means and said bearing means and adapted to at least partially surround and be spaced from the wall of said pipe.

* * * * *